(No Model.)
J. C. RICHBERG.
TABLE CUTLERY.
No. 513,146. Patented Jan. 23, 1894.
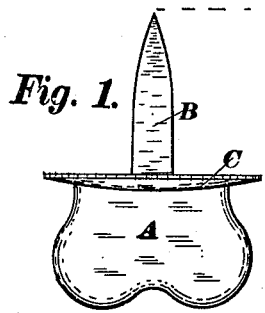
Fig. 1.
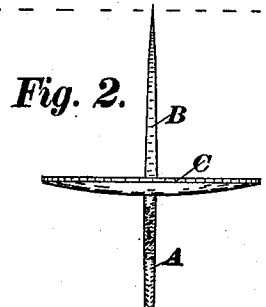
Fig. 2.
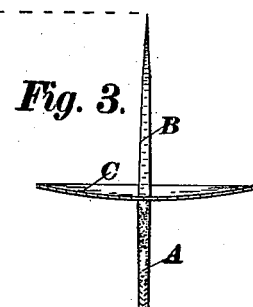
Fig. 3.
Fig. 4.
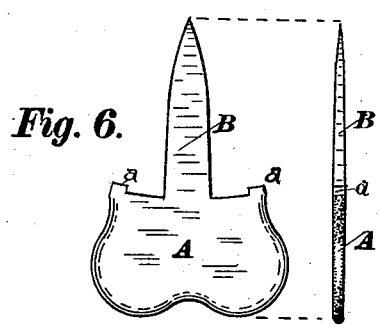
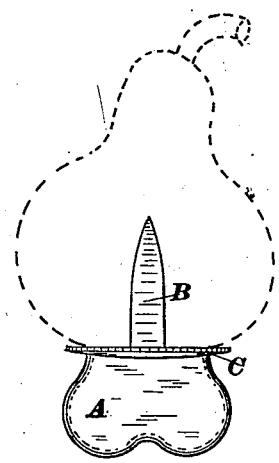
Fig. 5.
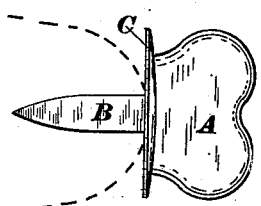
Fig. 6.
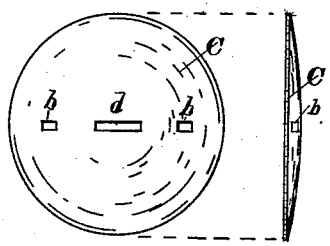
Fig. 7.
WITNESSES:
George W. Hoggatt
N. Maginn
INVENTOR:
John C. Richberg
By his attorney
Oscar Snell

UNITED STATES PATENT OFFICE.

JOHN C. RICHBERG, OF CHICAGO, ILLINOIS.

TABLE-CUTLERY.

SPECIFICATION forming part of Letters Patent No. 513,146, dated January 23, 1894.

Application filed November 18, 1891. Serial No. 412,293. (No model.)

*To all whom it may concern:*

Be it known that I, JOHN C. RICHBERG, a citizen of the United States, residing at Chicago, in the county of Cook and State of Illinois, have invented a new and useful article of Table-Cutlery, of which the following is a specification.

My invention relates to a novel means for handling a great variety of vegetables or fruits while eating them without soiling the fingers as will be hereinafter explained.

My objects are to provide a neat and simple construction which is light in weight and of a form perfectly adapted to the purpose and which can be easily cleaned. These objects are attained by the means illustrated in the accompanying drawings, in which—

Figure 1 is a side, and Fig. 2 an edge view. Fig. 3 is same as Fig. 2 with the exception that the flange is shown in section to show its concavo-convex shape. Fig. 4 shows two pieces of this cutlery applied to the ends of an ear of Indian corn; corn shown in outline in dotted lines. Fig. 5 shows manner of attaching to a pear. Fig. 6 shows, respectively, side and edge views of the handle and prod as they appear when stamped out of one piece of metal. Fig. 7 shows a guard flange, respectively, in top and edge views as it appears detached from the part shown in Fig. 6. Figs. 6 and 7 show the parts as they appear when cut out of sheet metal by means of dies and afterward stamped and when assembled appear like Fig. 1.

Similar letters refer to like parts throughout the several views.

A is the handle or finger piece, which is preferably made as large as is shown in Fig. 1, in order to be easily grasped by the fingers.

B is a prod which can be either square or round in cross section and of a length and shape so that it can be easily forced into the end of an ear of corn, vegetable, or into an article of fruit and retain a firm hold so as not to be easily detached in the action of eating the food.

At G is a circular flange which is preferably made of a concavo-convex form, and of a diameter to best serve as a guard against the juices of the food reaching the fingers grasping handle A.

Fig. 6 shows handle A and prod B cut out of one piece of metal, leaving projections $a$, which fit into perforations $b$ in flange C. Flange C is also perforated at $d$ to receive prod B so that when the parts are assembled projections $a$ serve as rivets to firmly secure the parts together. All the parts can be cast in one piece, however, like Fig. 1.

There are a number of different articles of food, such as Indian corn in the ear, potatoes, and various kinds of fruit which are not eaten in their natural form for the reason that, their juices soil the fingers when held in the ordinary way, and then, when they have been cooked they are frequently too hot to be held comfortably without some means similar to what has been hereinbefore shown and described, which means I claim is a novelty and exceedingly useful for the purpose intended.

I claim as my invention—

An article of table cutlery comprising a flat handle and prod formed from a single piece of material and a perforated guard secured thereto, the handle being provided with a shoulder on each side of the prod, and each shoulder being provided with a projection which is passed through the outer perforations in the guard and bent or riveted down upon the same for permanently holding the parts together, substantially as set forth.

JOHN C. RICHBERG.

Witnesses:
J. H. POAGE,
OSCAR SNELL.